Figure 1:
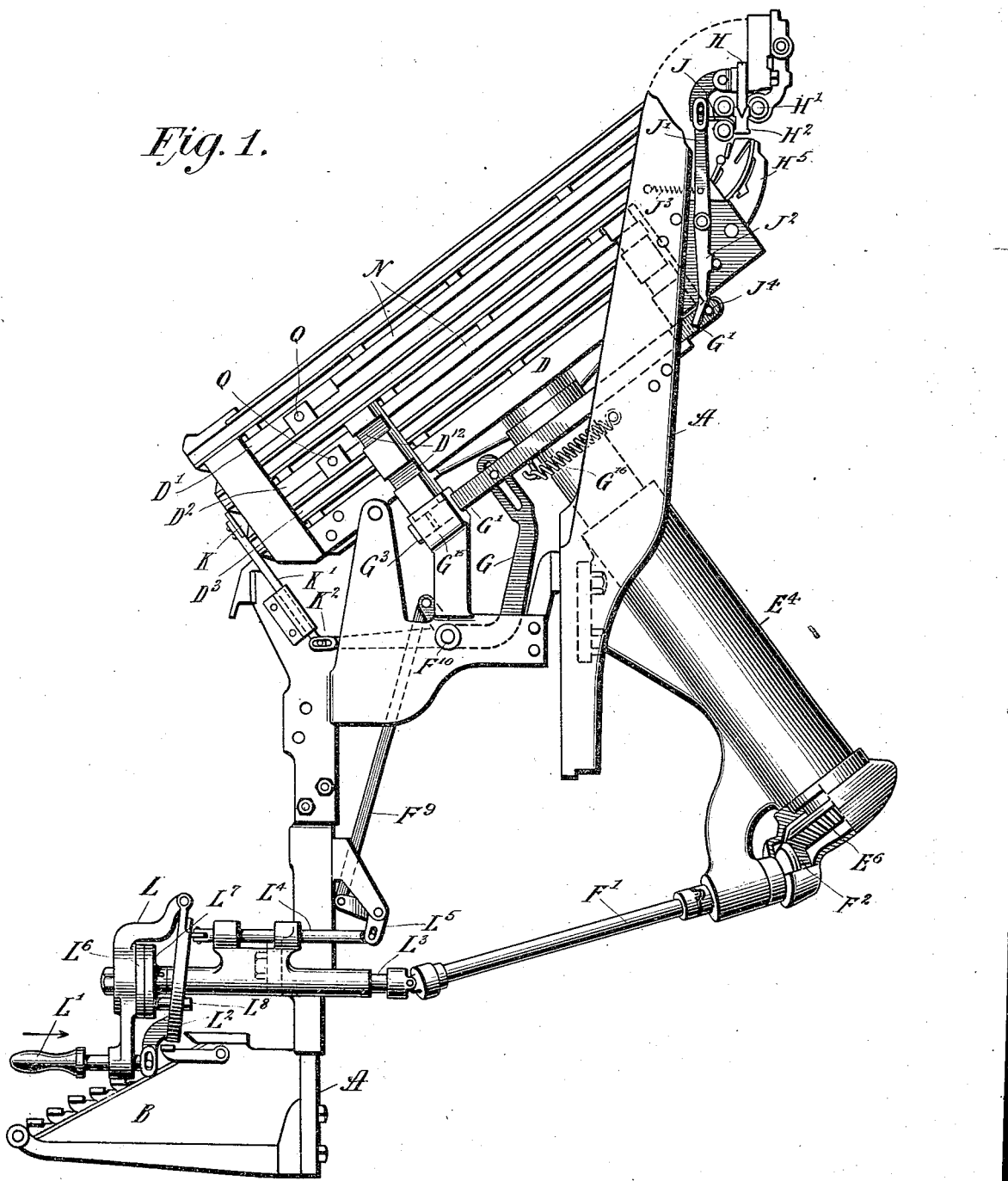

J. R. ROGERS.
LINE CASTING MACHINE.
APPLICATION FILED MAY 1, 1911.
1,109,872.
Patented Sept. 8, 1914.
11 SHEETS—SHEET 4.
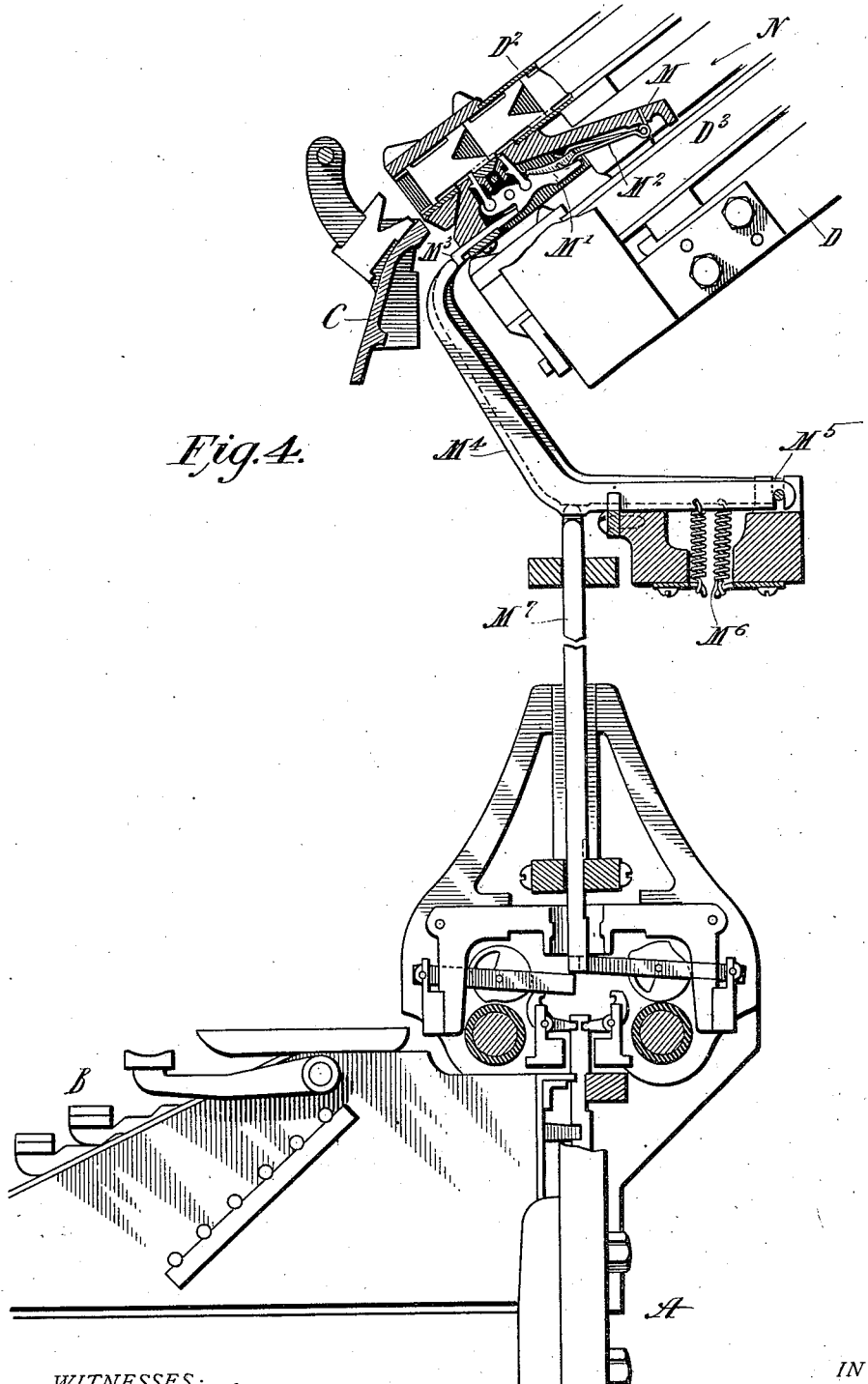
Fig. 4.
WITNESSES:
INVENTOR.
JOHN R. ROGERS,
BY 
ATTORNEY.

J. R. ROGERS.
LINE CASTING MACHINE.
APPLICATION FILED MAY 1, 1911.

1,109,872.

Patented Sept. 8, 1914.
11 SHEETS—SHEET 7.

WITNESSES:

INVENTOR.
JOHN R. ROGERS
BY
ATTORNEY.

J. R. ROGERS.
LINE CASTING MACHINE.
APPLICATION FILED MAY 1, 1911.

1,109,872.

Patented Sept. 8, 1914.
11 SHEETS—SHEET 9.

WITNESSES:

INVENTOR.
JOHN R. ROGERS,
BY
ATTORNEY.

J. R. ROGERS.
LINE CASTING MACHINE.
APPLICATION FILED MAY 1, 1911.

1,109,872.

Patented Sept. 8, 1914.
11 SHEETS—SHEET 10.

WITNESSES:

INVENTOR.
JOHN R. ROGERS
BY
ATTORNEY.

J. R. ROGERS.
LINE CASTING MACHINE.
APPLICATION FILED MAY 1, 1911.

1,109,872.

Patented Sept. 8, 1914.
11 SHEETS—SHEET 11.

WITNESSES:

INVENTOR.
JOHN R. ROGERS,
BY
ATTORNEY.

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

LINE-CASTING MACHINE.

1,109,872.  Specification of Letters Patent.  Patented Sept. 8, 1914.

Application filed May 1, 1911. Serial No. 624,426.

*To all whom it may concern:*

Be it known that I, JOHN R. ROGERS, a citizen of the United States, and a resident of Brooklyn, county of Kings, and State of New York, have invented a new and useful Improvement in Line-Casting Machines, of which the following is a specification.

My invention has reference to linotype machines of the general organization represented in Letters Patent of the United States, No. 436,532, to O. Mergenthaler, wherein circulating matrices are released from a magazine in the order in which their characters are to appear in print and then assemble in line together with expanding spacers, the composed line transferred to the face of a mold, the mold filled with molten metal to form a slug or linotype against the matrices which produce the type characters thereon, and the matrices thereafter elevated and returned through a distributing mechanism to the magazine from which they started.

More particularly the invention relates to the employment of a number of fonts or sets of matrices representing different sizes or styles of type, in such manner that any font may be brought into action at will, so that matter may be produced with faces represented by the matrices in any one magazine, or by a combination of faces represented by the matrices in two or more magazines. Preferably I employ a series of superposed magazines in combination with means for shifting them and for bringing any selected one thereof into operative position.

The general features thus far described are old in the art and have been selected by me for the purpose of illustrating my preferred form in connection therewith.

In the employment of a plurality of shiftable magazines, and where a single distributer is used in connection therewith, it is of course essential that all of the matrices belonging to the magazine in operative position should be restored thereto before it is shifted and another one takes its place. If this does not occur serious difficulties and inconveniences may arise, the principal one being that the undistributed matrices belonging to one magazine would then be transferred to another containing an entirely dissimilar font, with a resulting confusion and mixture of characters, as will be obvious to those familiar with the art. Such a mixture of fonts now occurs in the employment of these machines at the hands of a careless operator who fails to ascertain that the distribution is complete before shifting the magazines. In order to be sure that no matrices remain undistributed, it is ordinarily necessary for him to leave his place at the keyboard and examine the distributer for the purpose indicated, or else to wait a considerable period to permit the necessary operation. In other words, he is subjected to the inconvenience of leaving his place, or else to an unnecessary loss of time. It is one of the purposes of my present invention to enable him to investigate at will the absence or presence of matrices in the distributer by mechanical means which are conveniently located, and in addition connected devices are provided which prevent the shifting of the magazines while any matrices remain undistributed. In this specific respect my invention relates to means coöperating with the distributing mechanism to prevent the shifting of the magazines while any matrices are undistributed, and in the form shown and illustrated, these means comprise a manually operable feeler which enters the distributer freely when the latter is empty, but which is prevented from so doing when matrices are present therein. The shiftable magazines are provided with devices for registering and locking them in position and the registering means are preferably connected to the feeler in such manner as to prevent the unlocking of the magazines unless the distributer be empty.

It is similarly desirable to prevent the shifting of the magazine if one or more matrices protrude therefrom, which condition sometimes exist in the event of an accidental displacement of a matrix or matrices, as when they are not properly controlled by the escapement mechanism. In such circumstances the attempted shifting of the magazine would probably result in breakage or distortion of the parts, and I therefore also provide a manually operable blade or feeler to determine whether or not the matrices are entirely contained within it, and this blade or feeler is also connected to the registering and locking devices in such manner as to prevent the unlocking of the magazine if a matrix or matrices protrude therefrom. In other words, it is impossible to move the magazines from one position to another either in the event that matrices are in course of distribution, or in the event that matrices protrude from a magazine. That is to say, before the magazine can be shifted, it is essential that the matrices thereof be properly inclosed within it; and it is further to be noted that the shifting means are controlled by the matrices themselves.

Another object of my invention is to facilitate the independent removal and application of the several magazines, so that magazines carrying matrices of any desired faces or fonts may be speedily brought into use. As previously stated, I preferably employ a series of superposed magazines which are shiftable together so as to bring any desired or selected one into operative position. In order to facilitate the removal and interchangeability of the magazines individually, I preferably mount one or more of them upon independent pivoted base frames, somewhat similar to that disclosed in Letters Patent of the United States, No. 830,436, September 4, 1906, to T. S. Homans. Due to this arrangement the magazines may be separated vertically to permit the removal of one of them without removing the others, this being accomplished specifically by rocking the supporting base frames about their pivots. In this way the necessary space is afforded to permit the removal of any desired magazine and the substitution of another therefor without disturbing or affecting any of the others in the superposed series.

In order to facilitate further the removability and interchangeability of the magazines, I preferably employ a separable bank of escapements in connection with each of them, which bank of escapements is detachably secured in relation thereto and to the framework in such manner that it may be readily removed from and restored to its operative position, as hereinafter more fully described. As will be readily seen, this combination of a plurality of separable magazines and of corresponding detachable escapements results in extreme simplification and the possibility of interchanging the magazines with the utmost convenience and despatch.

As the series of magazines is shifted bodily, and as one or another of them is brought into position, it will be obvious that the escapements corresponding thereto must similarly be brought into operative engagement with the connections from the keyboard, and I therefore provide a form of escapement actuating device adapted to engage with the several escapements and mounted so as to yield in the event of undue strain or obstruction. Other points of novelty and improvement will appear from the detailed description which follows.

In the accompanying drawings I have shown my invention as applied to a linotype machine, as before stated, but obviously it may similarly be used in connection with type setting machines, or in fact any kind of typographical machine, and I therefore desire it to be distinctly understood that I do not limit myself to any specific form or embodiment except in so far as such limitations are specified in the claims.

Figure 2:
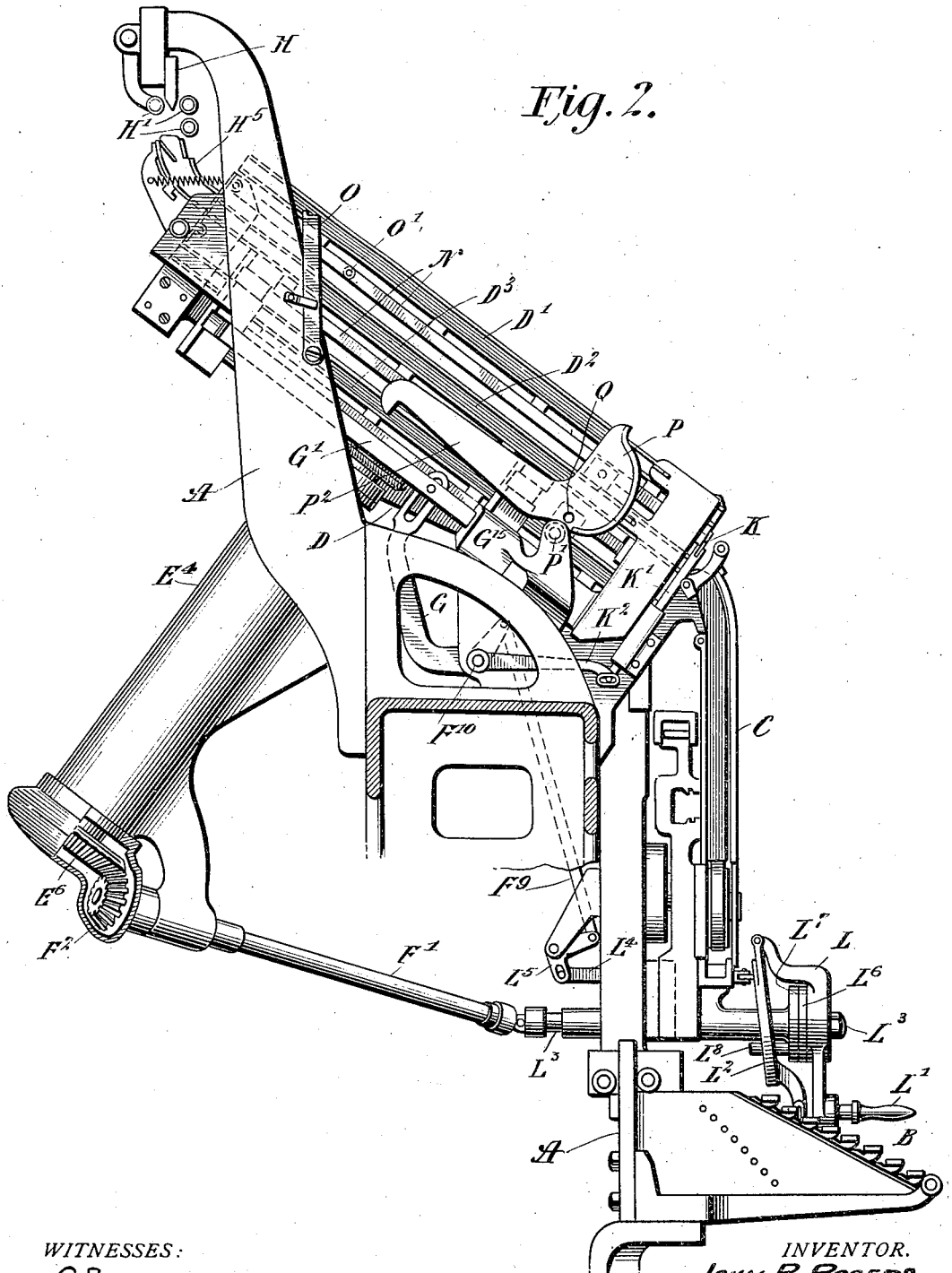
Figure 3:
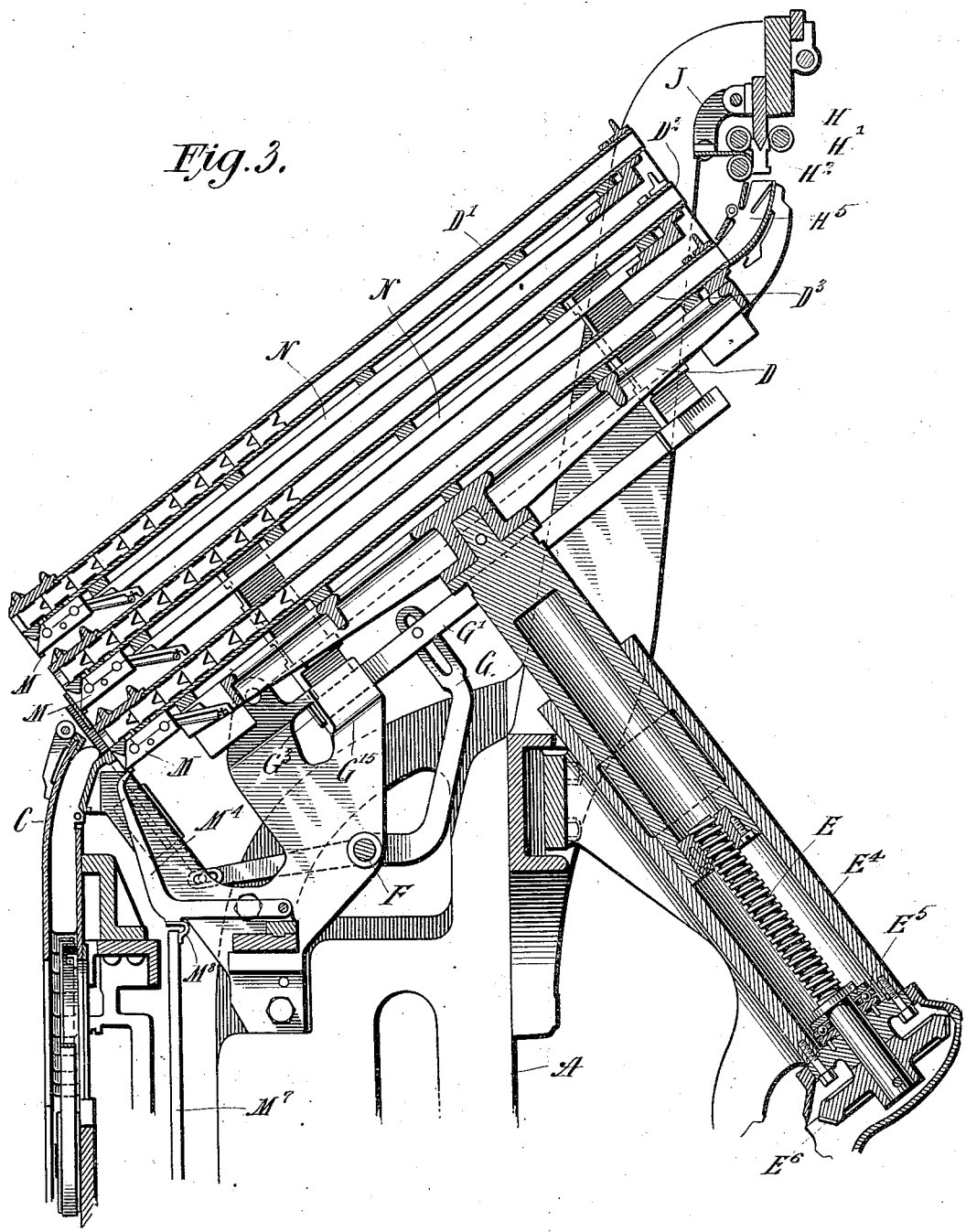
Figure 5:
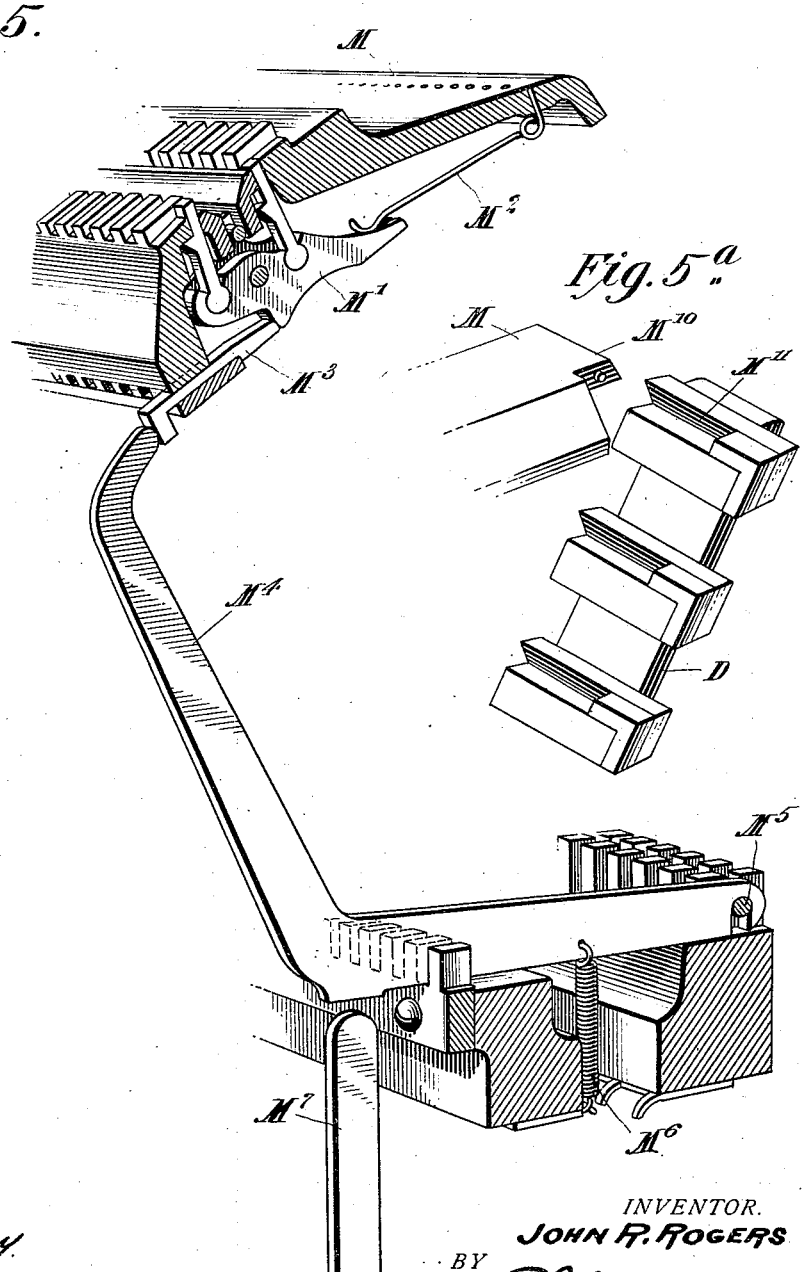
Figure 6:
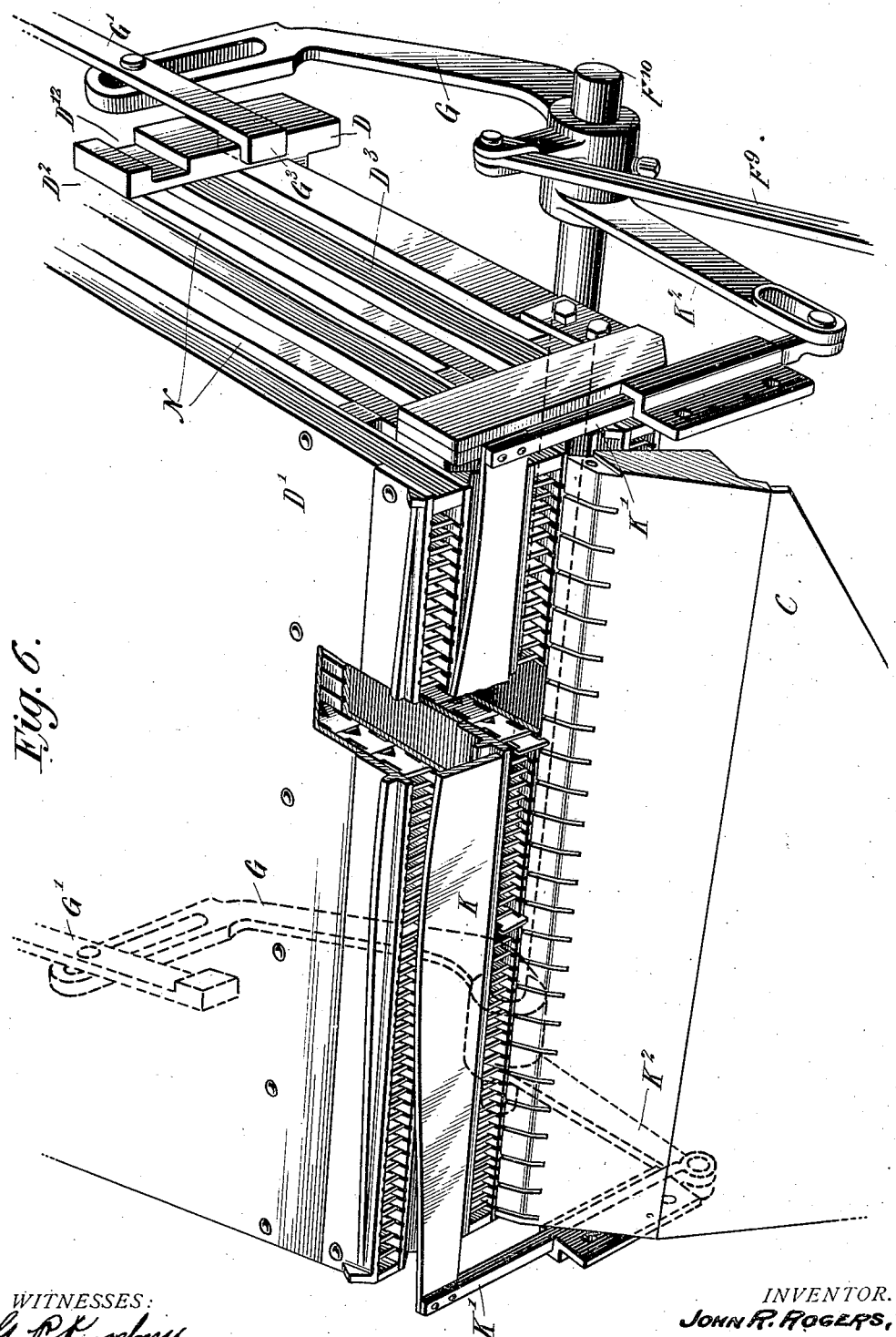
Figure 7:
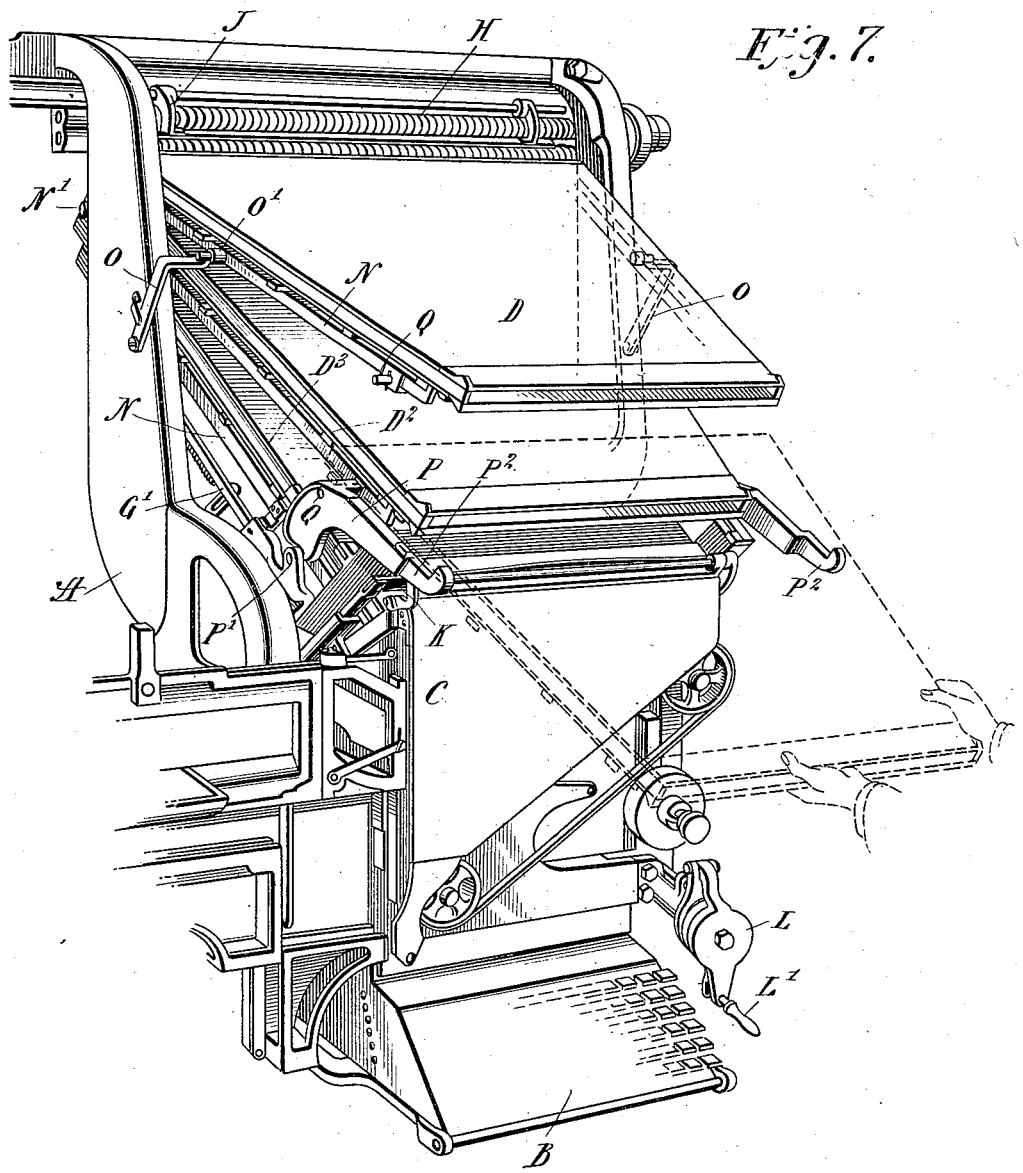
Figure 8:
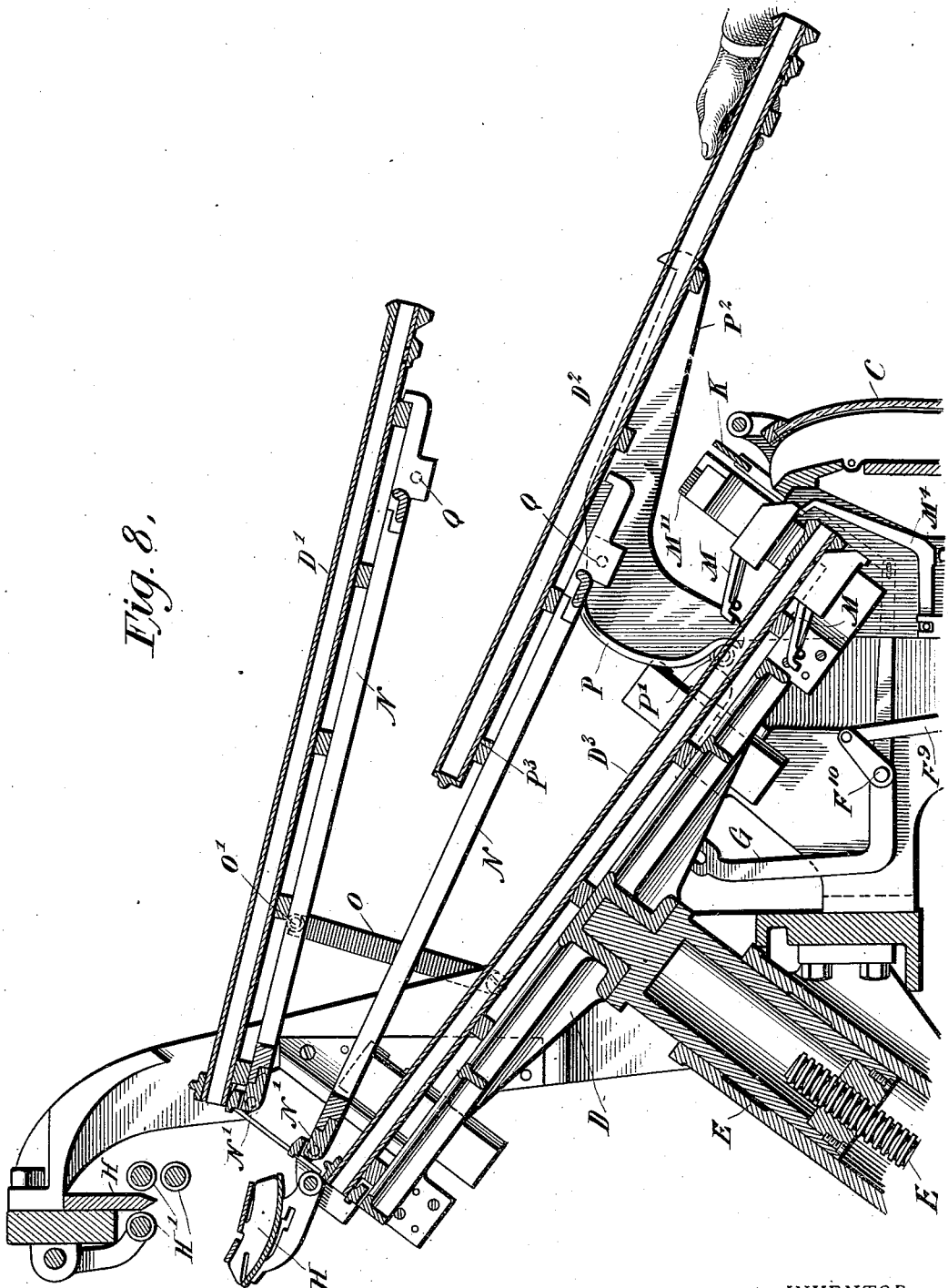
Figure 9:
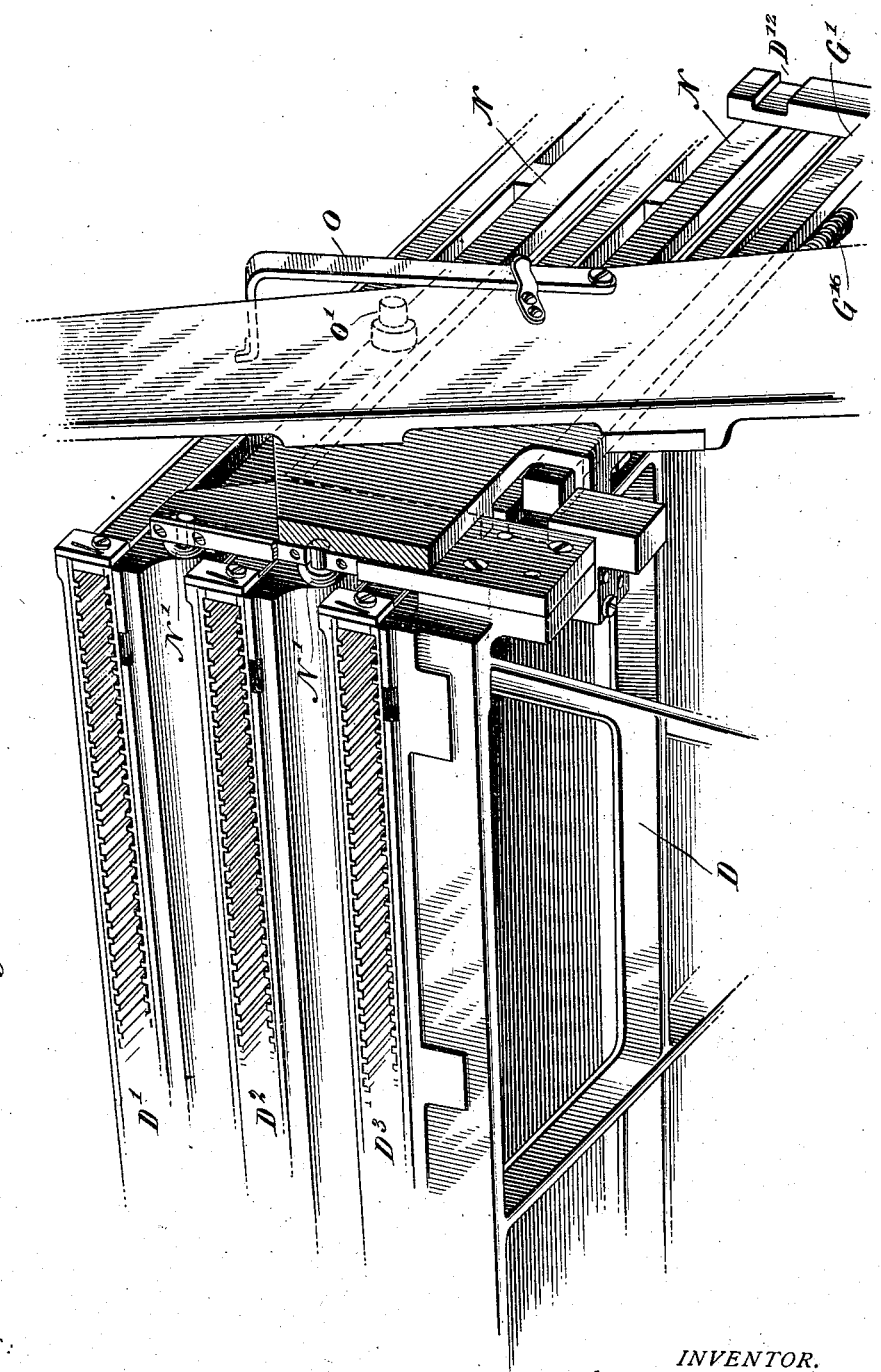
Figure 10:
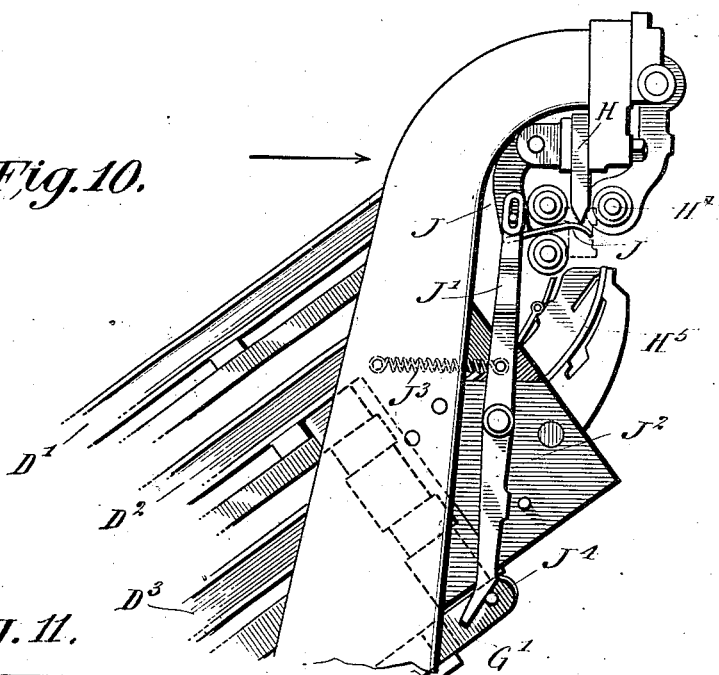
Figure 11:
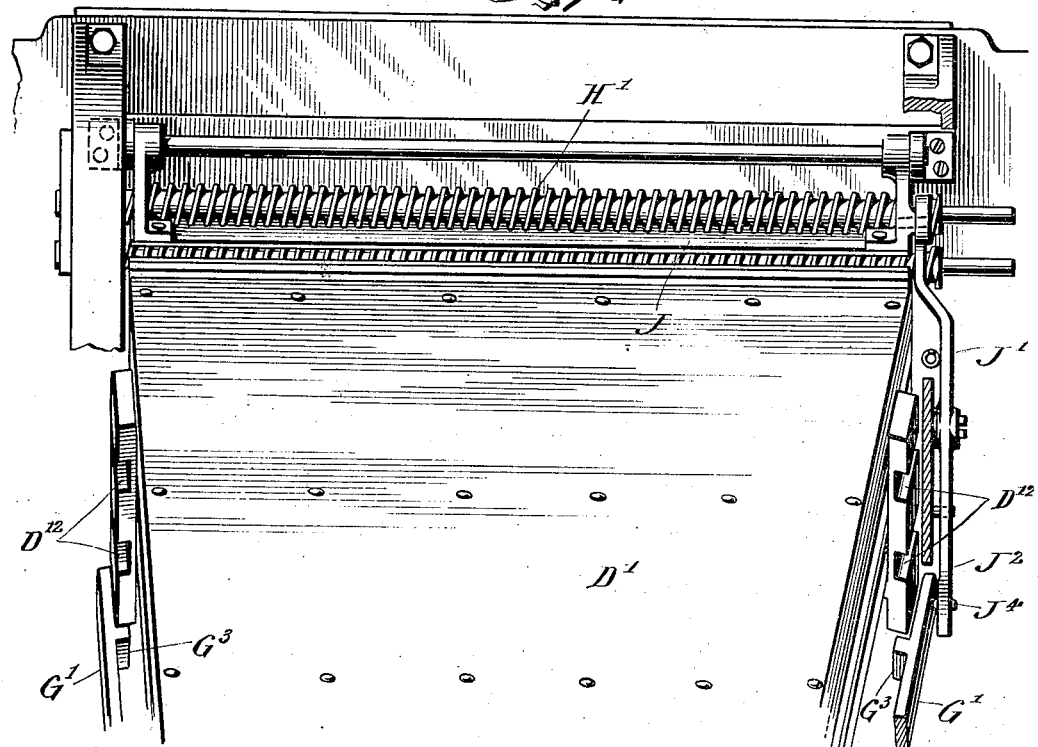
Figure 12:
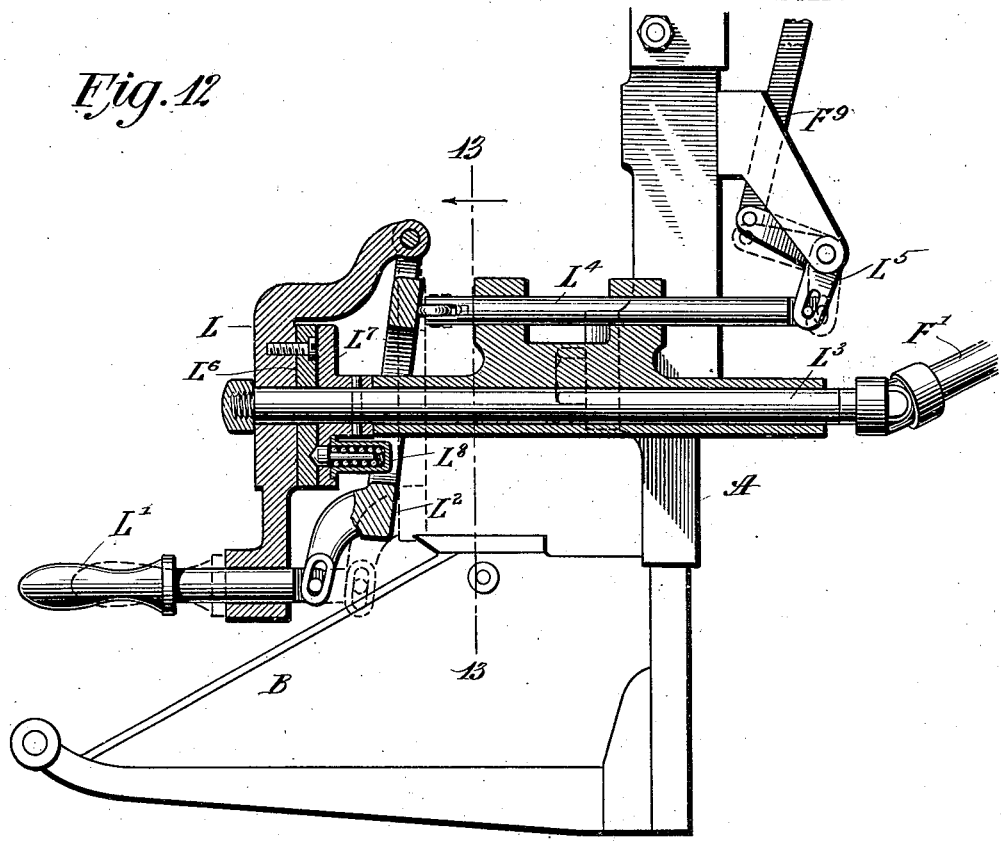
Figure 13:
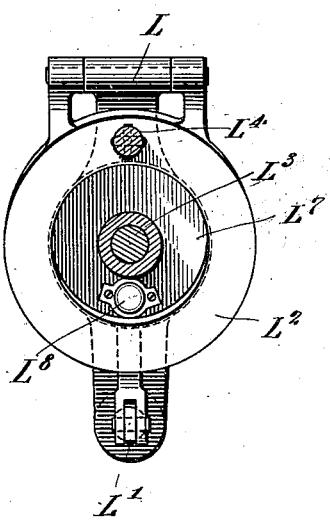

Referring to the drawings: Figure 1 is a right-hand elevation, partly broken away, of a part of the upper portion of a linotype machine showing my invention applied thereto; Fig. 2 is a similar left-hand elevation, partly in section; Fig. 3 is a vertical section of the same; Fig. 4 is an enlarged sectional view of the escapement mechanism and the connections to the keyboard; Fig. 5 is a sectional view on an enlarged scale of some of the parts shown in Fig. 4; Fig. 5$^a$ is a perspective detail view showing the means for supporting the escapement bank; Fig. 6 is a front view on an enlarged scale, partly broken away, of the magazine, etc.; Fig. 7 is a front view of the upper part of a linotype machine, showing the magazines as separated and the method of interchanging them; Fig. 8 is a vertical sectional view taken through the magazines and illustrating the removal of one of them; Fig. 9 is a detached rear view on an enlarged scale of the magazines, etc.; Fig. 10 is an end view of the distributing mechanism, etc.; Fig. 11 is a front view of the same; Fig. 12 is a longitudinal sectional view of the devices for actuating the magazine shifting and locking means; and Fig. 13 is a transverse sectional view thereof taken on the line 13—13 of Fig. 12.

The machine as usual is provided with the main frame A, the key-board B which controls the release of the matrices, and the grooved front or channel plate C through which the matrices descend from the magazine to the assembling position, all in the manner well understood by those skilled in the art. The shiftable magazines $D^1$, $D^2$, and $D^3$ are mounted in a frame D and are bodily movable therewith, so that any selected one may be brought into operative position in relation to the channel plate C. The individual magazines are also arranged so that they may be replaced by others when desired, as will be hereinafter described. The shifting of the frame D and magazines $D^1$, $D^2$ and $D^3$, (see more particularly Figs. 1, 2, 3, 12 and 13) is effected by means of the screw rod E threaded into the frame D and supported in the stationary external bracket $E^4$ connected to the frame-work A. If desired an antifriction bearing $E^5$ may be employed between the screw E and the bracket $E^4$ to sustain the weight of the magazines and magazine frame. The screw E is provided with a bevel pinion $E^6$ meshing into an actuating bevel pinion $F^2$, thus imparting motion to the rod E, and in this manner through the action of the screw-threads thereon the magazines may be raised or lowered as desired. The specific means thus far described for raising and lowering the magazines are somewhat similar to those employed for substantially the same purposes in my former Letters Patent No. 848,771, in the patent to D. S. Kennedy, No. 848,310, and the patent to P. T. Dodge, No. 800,556. Certain features different in function and mode of operation are now to be described.

The bevel pinion $F^2$ is mounted upon the shaft $F^1$, and in order that the actuating devices may be located in proximity to the keyboard and in convenient position for the operator, the shaft $F^1$ is angularly mounted in the framework and connected by a flexible joint to the shaft $L^3$. This feature of construction and location involves a substantial advantage over the devices previously employed for the same purpose, as all of the parts are now in convenient position, and the operator may actuate them without leaving his position at the keyboard and without undue reaching. The hand wheel L is mounted loosely upon the shaft $L^3$ and is provided with a clutch disk $L^6$, located in immediate proximity to a corresponding clutch disk $L^7$ fast upon the shaft $L^3$. The disk $L^7$ carries a spring actuated pin $L^8$, adapted to engage with a corresponding depression in the disk $L^6$, thus constituting the clutch or safety device. In ordinary circumstances the pressure of the pin $L^8$ is sufficient to cause the rotation of the shaft $L^3$ by the hand-wheel L. However, in the event of undue strain or pressure, such for instance as would be occasioned by the effort to shift the magazines before they were properly unlocked, the clutch pin $L^8$ would be forced out of the aperture in the disk $L^6$ and the wheel L would then simply rotate without effect upon the shaft $L^3$. The wheel L is provided with a longitudinally movable handle $L^1$ which serves the double function,—first, of rotating the wheel L, shaft $L^3$, and thus through the previously described connections shifting the magazines, and second, by its longitudinal motion of unlocking the magazines to permit their shifting. At the inside of the wheel L, and surrounding the shaft $L^3$ and the pin $L^8$, is pivoted the annular piece or ring $L^2$. Due to this construction and arrangement the ring $L^2$ is enabled to rotate with the hand-wheel L without interfering with the other parts. The ring $L^2$ contacts with the longitudinally movable unlocking rod $L^4$, which in turn actuates the elbow lever $L^5$, connecting rod $F^9$, and rock shaft $F^{10}$, subsequently to be described. The ring $L^2$ is swung about its pivot so as to actuate the unlocking rod $L^4$ by the longitudinal movement of the handle $L^1$, which is connected thereto by a pin and slot. The rod $L^4$ is normally held in close relation to the ring $L^2$ by the spring $G^{16}$ hereinafter to be referred to. The normal operation of these parts is as follows: The operator grasps the handle $L^1$ and moves it inwardly thus swinging the ring $L^2$ about its pivot and actuating the rod $L^4$, elbow lever $L^5$, link $F^9$, and rock-shaft $F^{10}$, from which the locking and registering means for the shiftable magazines are controlled in the manner subsequently to be pointed out. The wheel L is then rotated by the handle $L^1$, effecting the rotation of the shaft $L^3$ and the shifting of the magazines in the manner previously described.

The registering and locking means for the magazine in operative position are controlled from the rock shaft $F^{10}$ (see particularly Figs. 1, 2, 3 and 6). Upon the ends of the shaft $F^{10}$ are mounted a pair of arms G, connected by slot and pin connections to the slide pieces $G^1$, $G^1$, which are rigidly guided in brackets $G^{15}$ and are formed at their ends with registering or locking pieces $G^3$, $G^3$ adapted to engage with notches $D^{12}$, $D^{12}$, formed in the shiftable magazine frame D, and corresponding to the operative positions of the several magazines $D^1$, $D^2$ etc. (see Figs. 1 and 6). When thus engaged, it will be obvious that the selected magazine is registered and locked in operative relation to the channel plate C, as previously described, and before the magazines can be shifted to a new position it is necessary to withdraw the locking pieces $G^3$, $G^3$, from the respective notches. The slides $G^1$, $G^1$ are held in their rearward or operative position by the spring $G^{16}$, which spring acting through the arms G, G, rock-shaft $F^{10}$, link $F^9$, elbow lever $L^5$, and rod $L^4$, holds the pivoted ring $L^2$ and the handle $L^1$ in their outward or inoperative position, this corresponding to the locking or engaging position of the pieces $G^3$, $G^3$, in the locking notches $D^{12}$, $D^{12}$ of the magazine frame D. As previously pointed out, the inward movement of the handle $L^1$ unlocks the magazines and permits them to be shifted by the rotation of the wheel L.

As before noted, the locking piece $G^3$ is yieldingly moved to operative position by the spring $G^{16}$, and when the magazine frame is being shifted, the piece $G^3$ stands beyond the notches $D^{12}$ and bears against the frame until a notch is brought into position, when the locking piece is snapped into it.

In order to prevent the shifting of the magazines until the matrices of the one in position are all returned thereto, I employ the blade or feeler J (see particularly Figs. 1, 3, 10 and 11), which is pivotally mounted and capable of a limited movement into the distributing space beneath the distributer bar H, and between the distributer screws H², H¹, H¹. The blade or feeler J is connected by a pin and slot to the arm J¹ of a pivoted lever, the other arm J² of which is located in position tot be operated upon by the pin J⁴ upon the adjoining slide-piece G¹. Also connected to the arm J¹ is a spring J³, so arranged as to hold the blade or feeler J normally outside of and away from the space beneath the distributer bar H, and simultaneously to hold the arm J² in operative relation to the pin J⁴. As previously described, when the operator moves the handle L¹ inwardly, the rock-shaft F¹⁰ is rotated and through the arm G the slide G¹ is moved forwardly and the pin J⁴ thereon contacts with the arm J² and tends to throw the blade or feeler J into the distributing space. If no matrices are in the course of distribution, this movement of the blade or feeler is permitted, as indicated in full lines in Fig. 10. If, however, a matrix H² be present therein, as shown in Figs. 1 and 3, the movement of the blade or feeler into the distributing space is resisted and prevented. In the latter event, and because of the contact of the pin J⁴ on the slide G¹ with the arm J², and because of the connections previously described, the operator is unable to move the handle L¹ longitudinally, nor is this movement permitted until all of the matrices have been distributed and the distributing space is left free and clear. It therefore follows that the locking pieces G³, G³ must similarly remain in operative position and thus hold the magazine against being shifted until all of the matrices of the magazine in action shall have been restored thereto.

I have similarly provided the front end of the magazine with a blade or feeler K (see particularly Fig. 6), which is mounted upon suitably guided slide pieces K¹, K¹, so as to move across the mouth of the magazine and thus to detect the presence of matrices protruding therefrom. The slide pieces K¹, K¹, are connected by pins and slots to arms K², K², rigidly mounted upon the rock shaft F¹⁰. When the handle L¹ is operated to unlock the magazines and the rock shaft F¹⁰ is thereby rotated, the blade K through the connections described will be moved downwardly across the mouth of the magazine. If, however, a matrix or matrices protrude therefrom, as shown in Fig. 6, this movement of the blade K will be prevented, and therefore the rotation of the shaft F¹⁰ and the inward movement of the handle L¹ will be resisted and prevented, and the locking pieces G³, G³, will be retained within the locking notches G¹², G¹², of the magazine shift frame D. In other words, due to the construction and arrangement already set forth, the unlocking of the magazines is prevented so long as there are any matrices in course of distribution, or if matrices protrude from the magazine; that is to say, I have shown and described means which prevent the unlocking and shifting of a magazine unless the matrices thereof be properly inclosed therein; and further it is to be noted that the locking and registering means are thus governed directly by the matrices themselves.

Each of the magazines D¹, D², D³, consists, as usual, of two parallel plates secured to intermediate spacing pieces, and provided in their inner opposing faces with longitudinal grooves or channels to receive and guide the edges of the matrices, which enter the magazines from the distributing mechanism through the throat H⁵ at the upper end, and escape one at a time at the lower end, where they are controlled by the escapement. Although in the present instance I have illustrated the employment of three magazines, it will be obvious that the exact number thereof is not essential to the practice of my invention. The lower magazine D³ rests directly upon the shift frame D and may be lifted therefrom when desired to permit another one to be substituted therefor. The two upper magazines D¹, and D², are removably seated upon the underlying base frames N, N, which remain permanently in the shift frame D. These underlying base frames N, N, are in some respects similar to that shown in the patent to Homans, No. 830,436. Each of the base frames N, N, is pivoted at its upper end at N¹, N¹ in the shift frame D, in order that the lower end of the frame N and the magazine thereon may be lifted above the normal or operative position, thus permitting the vertical separation of the magazines and facilitating their interchangeability (see particularly Figs. 3, 7, 8, and 9). Each of the frames N, near its lower end, carries a transverse rock shaft Q, adapted to receive at its opposite ends the cam pieces P, P, which are temporarily applied and locked to the shaft. The cams P are positioned and arranged so as to engage operatively with the rollers P¹, P¹, upon the shift frame D. When the cams stand as shown in Fig. 2, the magazine and its base frame are in operative position. When the magazine is to be removed, the cams P, P, are turned until they assume the position indicated in Fig. 8, the action of the cams P, P, upon the rollers P¹, P¹, serving to lift the lower end of the frame N and the magazine thereon above the normal position, and also to give them support in the new position, so that the lower or forward end of the magazine stands above the channel plate C and can be drawn forward from the machine without interference with the other parts (see Figs. 7 and 8). The employment of the rock shaft Q and of the cams P, P, which are firmly applied thereto, is particularly advantageous in the present instance, because it insures the turning of the two cams in unison, and therefore the equal elevation of the magazine at both ends without danger of twisting it out of shape. The importance of this feature is increased by the fact that the magazines are of comparatively light construction, and if once distorted it is extremely difficult to flatten them out again.

Each of the magazines $D^1$, $D^2$, $D^3$, is provided on its under side with a series of transverse bars or ribs to give it the required rigidity, as in the Homans patent already referred to, one of these bars, $P^3$, (see Fig. 8) near the upper end being extended laterally on each side, so that when the magazine is permitted to slide forward and downward from the machine the ends of the bar $P^3$ will ride upon and be sustained by the arms $P^2$, $P^2$, of the cams P, and so that the magazine is permitted to assume a pendent position as shown in the said Homans patent. When thus sustained it may be conveniently grasped, removed from the machine, and transferred to a rack or other support.

In applying a magazine to the machine it may be suspended on the arms $P^2$, $P^2$, and then tipped upward, at the forward end and slid backward to its operating position. It will be observed that its removal and replacement is thus easily performed, first because the magazine constructed without the usual heavy base frame is comparatively light, and second because it is guided and a large portion of the weight sustained by the frame during its movement to and from the operative position. When the magazine is in place one of the cross-bars at its lower end bears behind a shoulder on the base frame N, whereby it is securely held. In order to effect its removal it is only necessary to raise the lower end of the magazine by hand until this bar is disengaged.

Referring now to the escapement mechanism for releasing the matrices from the respective magazines, attention is directed particularly to Figs. 4 and 5, in which the escapements are shown as arranged in a bank M, one for each magazine. Each of these escapements consists, as usual in linotype machines, of a pivoted lever $M^1$ carrying two pawls or dogs which are projected alternately into the magazine in order to control the passing matrices, which are delivered one at a time from the open end of the magazine into the channel plate C. Each escapement is acted upon by a spring $M^2$ attached to the supporting bar and tending to reverse the position of the escapement and project one of the pawls into the magazine. The escapements are controlled in their action by vertically reciprocating bails or reeds $M^5$, which are actuated in the customary manner from the keyboard B, and which in turn operate the escapement actuating levers $M^4$. The keyboard mechanism is illustrated in Fig. 4 and is substantially the same as in the present linotype machine and is not claimed in itself as a part of the present invention. In essential respects the keyboard mechanism is like that disclosed in the patent to P. T. Dodge, No. 530,931. Each of the escapements $M^1$ in the present instance is directly acted upon by a slide piece $M^3$ constituting a permanent part of the escapement bank. As previously stated, there is a separate bank of escapements for each magazine, and as the frame D is shifted, the slide pieces $M^3$ belonging to the selected magazine are brought into position to be engaged and operated by the actuating levers $M^4$, previously referred to.

In order to effect the engagement of the actuating levers $M^4$ with the slide pieces $M^3$, as the latter are brought into operative position, I prefer to mount the levers $M^4$ so that they will yield slightly and thus insure their proper contact with the slides $M^3$, and also avoid the possibility of breakage or distortion of the parts. To this end, in Figs. 4 and 5, I have shown the levers $M^4$ as formed with open slots $M^5$, which engage the pivots. Springs $M^6$ are also connected to the levers $M^4$ to hold them in their normal position, but obviously in the event of undue strain or resistance the levers $M^4$ are permitted to rise slightly above their pivots against the pressure of the springs. In Fig. 3 I have shown a slightly different form wherein the levers $M^4$ are pivoted in the ordinary manner and the bail or reed $M^7$ is provided with a spring $M^8$ located between its end and the escapement actuating lever, the yield of the spring securing substantially the same results as those described in connection with the other form. Another advantage derived from such a yielding connection is that if the escapement meets any obstruction such as an overlying ear of a matrix, or the like, when the bail or reed rises, the spring will yield in the manner already described, and the parts are relieved from the danger of strain or breakage.

As previously indicated, there is a bank M of escapements for each of the magazines, and each of the banks is detachably mounted in the frame D in proper relation to its magazine. In the particular form illustrated (see Fig. 5a) the escapement bank M is provided at its ends with sustaining lips $M^{10}$, $M^{10}$, which engage and rest in recesses $M^{11}$ formed in the shift frame D. It will be seen that the several banks are thus mounted independently of the magazines and may be freely detached. Due to this engagement the escapement banks are held in fixed relation to the frame but may be readily removed therefrom when occasion demands. As in the Homans patent above referred to, the magazines are formed with slots in one side, and the escapement supporting bars are formed with ribs adapted to guide the escapement pawls and to fill the slots in the magazines when the latter are in the proper position, so that the ribs form in effect a part of the grooved magazine plate and aid in guiding the edges of the matrices. This feature of construction insures the proper registration of the escapements with regard to the magazine and assists in holding both in their proper relative positions.

The method of interchanging the individual magazines will now be apparent. If it be desired to remove the upper magazine $D^1$, the cams P are slipped upon the rock shaft Q of its base frame N and are operated in the manner previously described, so as to separate the magazine and its base frame vertically from the others, and simultaneously to free the magazine from engagement with its escapement bank M. When the parts are in the position described, the magazine $D^1$ may be slipped forwardly on its frame N, which sustains and suspends it until it is removed at the front. Another magazine may then be substituted therefor upon a reversal of the operations just described.

If it be desired to change the middle magazine $D^2$ (see Figs. 7 and 8), the upper magazine $D^1$ and its base frame N are temporarily sustained by the side arms O pivoted to the main frame, which may be swung to engage and hold the studs $O^1$ on the side of the frame N. The entire base frame D is then lowered, which causes the upper magazine and its frame to swing to the position shown in Fig. 8 where it will be maintained. The bank of escapements M, corresponding to the upper magazine $D^1$, is then lifted out of the frame D in the manner previously described. The middle magazine $D^2$ and its base frame N are then lifted by the cams P and simultaneously separated from its bank of escapements M, and the magazine may then be removed, as shown in Figs. 7 and 8.

Should it be desired to change the lower magazine $D^3$, the upper magazines $D^1$, $D^2$, their base frames N, N, and their escapement banks M, M, are manipulated in the manner already set forth, which permits the removal of the magazine $D^3$ from its seat upon the frame D. It will be understood that the frame D during these operations will be suitably controlled by the wheel L and the screw E to leave it in convenient positions therefor, and so as to locate the magazine to be removed clear of the face plate and other parts.

Having thus described my invention, its construction and mode of application, what I claim and desire to secure by Letters-Patent of the United States is as follows:

1. In a typographical machine, the combination of a plurality of magazines to contain the matrices, means for shifting the magazines, and independent locking means controlled by the matrices to prevent the shifting of the magazines unless the matrices be properly inclosed within the magazines.

2. In a typographical machine, the combination of a magazine to contain the matrices, means for shifting it, and independent locking means controlled by the matrices to prevent the shifting of the magazines unless the matrices be properly inclosed within the magazine.

3. In a typographical machine comprising adjustable parts, the combination of a magazine to contain the matrices, and independent locking means controlled by the matrices to prevent the adjustment of the said parts unless the matrices be properly inclosed within the magazine.

4. In a typographical machine, the combination of a magazine to contain the matrices, means for shifting it, and independent locking means controlled by the matrices to prevent the shifting of the magazine.

5. In a typographical machine, comprising matrices and manually controlled adjustable parts, independent locking means controlled by the matrices to prevent the adjustment of the said parts.

6. In a typographical machine, the combination of a distributing mechanism and manually operable means to determine at will the presence or absence of matrices in the distributing mechanism.

7. In a typographical machine, the combination of a distributing mechanism and means to determine at will the presence or absence of matrices in the distributing mechanism.

8. In a typographical machine, the combination of a distributing mechanism and a manually operable feeler to determine at will the presence or absence of type or matrices in the distributing mechanism.

9. In a typographical machine, the combination of a shiftable magazine adapted to contain matrices and movable means for preventing the shifting of said magazine, said means being controlled in its movements by the matrices.

10. In a typographical machine, the combination of a shiftable magazine adapted to contain matrices and movable means to control the shifting of said magazine, said means acting when a matrix is not properly inclosed within the magazine to prevent its shifting.

11. In a typographical machine, the combination of distributing mechanism, a magazine, a feeler to determine the presence or absence of matrices in the distributing mechanism, a second feeler to determine whether or not a matrix is protruding from the magazine, and connections between the two feelers whereby they may be operated simultaneously.

12. In a typographical machine, the combination of distributing mechanism, a magazine, and manually operable means to determine the presence or absence of matrices in the distributing mechanism, and whether or not a matrix is protruding from the magazine.

13. In a typographical machine, the combination of a plurality of magazines, means for shifting the magazines, and distributing mechanism, together with means coöperating with the distributing mechanism to prevent the shifting of the magazines while any type or matrices of the magazine in position remain undistributed.

14. In a typographical machine, the combination of a plurality of magazines, means for shifting the magazines and for bringing any selected one thereof into operative position, registering and locking means therefor, and distributing mechanism, together with means coöperating with the distributing mechanism and acting on the registering means to prevent the shifting of the magazines while any type or matrices of the magazine in position remain undistributed.

15. In a typographical machine, the combination of a plurality of magazines, means for shifting the magazines, and distributing mechanism, together with a feeler to determine the presence or absence of type or matrices in the distributing mechanism and connections to prevent the shifting of the magazines while any type or matrices of the magazine in position remain undistributed.

16. In a typographical machine, the combination of a plurality of magazines, means for shifting the magazines and for bringing any selected one thereof into operative position, registering and locking means therefor, and distributing mechanism, together with a feeler to determine the presence or absence of type or matrices in the distributing mechanism and connections to the registering means to prevent the shifting of the magazines while any type or matrices of the magazine in position remain undistributed.

17. In a typographical machine, the combination of a plurality of magazines, means for shifting the magazines and for bringing any selected one thereof into operative position, and distributing mechanism, together with actuating mechanism for the magazine-shifting means, and devices connected thereto and coöperating with the distributing mechanism to prevent the shifting of the magazines while any type or matrices of the magazine in position remain undistributed.

18. In a typographical machine, the combination of a plurality of magazines, means for shifting the magazines and for bringing any selected one thereof into operative position, registering and locking means therefor, and distributing mechanism, together with actuating mechanism for the registering means, and a device connected thereto and coöperating with the distributing mechanism to prevent the movement of the registering means while any type or matrices of the magazine in position remain undistributed.

19. In a typographical machine, the combination of a plurality of shiftable magazines, a distributing mechanism, and a manually operable feeler to determine the presence or absence of type or matrices in the distributing mechanism, and connections to prevent the shifting of the magazines while any type or matrices of the magazine in position remain undistributed.

20. In a typographical machine, the combination of a plurality of magazines, means for shifting the magazines and for bringing any selected one thereof into operative position, a distributing mechanism, a manually operable feeler to determine the presence or absence of type or matrices in the distributing mechanism, and connections to prevent the shifting of the magazines while any type or matrices of the magazine in position remain undistributed.

21. In a typographical machine, the combination of a plurality of magazines, means for shifting the magazines and for bringing any selected one thereof into operative position, registering and locking means therefor, a distributing mechanism, a manually operable feeler to determine the presence or absence of type or matrices in the distributing mechanism, and connections acting upon the registering means to prevent the shifting of the magazines while any type or matrices of the magazine in position remain undistributed.

22. In a typographical machine, the combination of a plurality of magazines, means for shifting the magazines, and a distributing mechanism, together with means coöperating with the matrices in course of distribution to prevent the shifting of the magazines.

23. In a typographical machine, the combination of a magazine, means for shifting it, and a distributing mechanism, together with means coöperating with the matrices in course of distribution to prevent its shifting.

24. In a typographical machine comprising manually-controlled adjustable parts, the combination of a magazine to contain the matrices, a distributing mechanism, together with means controlled by the matrices in course of distribution to prevent the adjustment of the said parts.

25. In a typographical machine, the combination of a magazine adapted to contain matrices, means for shifting it, and independent locking means controlled by a protruding matrix or matrices to prevent its shifting.

26. In a typographical machine, the combination of a plurality of magazines adapted to contain matrices, means for shifting the magazines, and independent locking means controlled by a protruding matrix or matrices to prevent the shifting of the magazines.

27. In a typographical machine comprising manually controlled adjustable parts, the combination of a magazine to contain the matrices and independent locking means controlled by a protruding matrix or matrices to prevent the adjustment of the said parts.

28. In a typographical machine, the combination of a plurality of removable magazines arranged in connected series and in close proximity to each other, and each pivotally mounted at one end thereof to permit a rocking movement of one magazine with reference to another and thus to facilitate their interchangeability.

29. In a typographical machine, the combination of a plurality of removable magazines arranged vertically one above the other in connected series and in close proximity to each other, and each pivotally mounted at one end thereof to permit a rocking movement of one magazine with reference to another and thus to facilitate their interchangeability.

30. In a typographical machine, the combination of a plurality of removable magazines arranged in connected series and in close proximity to each other, and each pivotally mounted at one end thereof to permit a rocking movement of one magazine with reference to another and thus to facilitate their interchangeability, together with means for effecting the said rocking movement.

31. In a typographical machine, the combination of a plurality of removable magazines in connected series and in close proximity to each other, and means for separating the magazines vertically to permit the removal of one of them without disturbing the others.

32. In a typographical machine, the combination of a plurality of removable magazines in connected series and in close proximity to each other, and mounted so that they may be separated to permit the removal of one of them without disturbing the others, with means for separating the magazines and for holding them separated.

33. In a typographical machine comprising a plurality of removable magazines, a plurality of supporting frames for the respective magazines, the said frames being arranged in connected series and in close proximity to each other, and each movable vertically to permit of their separation and to facilitate the removal of the magazines.

34. In a typographical machine, the combination of a plurality of removable magazines disposed vertically one above the other, and a corresponding plurality of supporting frames therefor in connected series and in close proximity to each other, the said supporting frames being each pivoted at one end thereof to permit the vertical rocking and separation of the respective magazines and thus to facilitate their removal.

35. In a typographical machine, the combination of a plurality of removable magazines with a corresponding plurality of supporting frames therefor in connected series and in close proximity to each other, the said frames being each pivotally mounted at one end thereof to permit the separation of the magazines and to facilitate their removal.

36. In a typographical machine, the combination of a plurality of removable magazines and suitable supports therefor in connected series and in close proximity to each other, and means for separating the supports vertically to permit the removal of one of the magazines from its support without disturbing the others.

37. In a typographical machine comprising a plurality of removable magazines, a plurality of supporting frames for the respective magazines, the said frames being arranged in connected series and in close proximity to each other and being independently pivoted to permit of their rocking separation and to facilitate the removal of the magazines.

38. In a typographical machine, the combination of a series of magazines movable vertically as a whole to bring one or another into operative position and also movable vertically with relation to each other to facilitate the removal of any one of them without disturbing the others.

39. In a typographical machine, the combination of a series of magazines movable vertically as a whole to bring one or another into operative position and each capable of a vertical rocking movement with relation to the others to facilitate the removal of any one of them without disturbing the others.

40. In a typographical machine comprising a plurality of magazines, the combination of a shift frame to move the magazines into and out of operative position, and a plurality of magazine supporting frames movably mounted upon and with reference to the shift frame to permit of their separation and to facilitate the removal of the magazines.

41. In a typographical machine comprising a plurality of magazines, the combination of a shift frame to move the magazines into and out of operative position, and a plurality of magazine supporting frames pivotally mounted upon the shift frame to permit of their rocking separation about their pivots and to facilitate the removal of the magazines.

42. In a typographical machine, the combination of a magazine and means for shifting it into and out of operative position, the said magazine being pivotally mounted with reference to the shifting means, together with independent supporting means for the magazine whereby it may be moved about its pivot by the operation of the shifting means.

43. In a typographical machine, the combination of a plurality of magazines and means for shifting them as a whole, one of the said magazines being pivotally mounted with reference to the shifting means, together with independent supporting means for the said magazine whereby it may be moved about its pivot and with relation to the other magazines by the operation of the shifting means.

44. In a typographical machine, the combination of a magazine frame, a plurality of removable magazines mounted therein, and a corresponding plurality of banks of escapements for the respective magazines, the said banks of escapements being freely and independently mounted in and detachably connected to the said frame to permit of their ready removal and thus to facilitate the removal of the magazines.

45. In a typographical machine, the combination of a magazine frame, a plurality of removable magazines mounted therein, and a corresponding plurality of banks of escapements for the respective magazines, both the magazines and the banks of escapements being freely and independently mounted in and detachably connected to the said frame to facilitate the interchangeability of the magazines.

46. In a typographical machine, the combination of a magazine frame, a pair of removable magazines mounted therein, and a bank of escapements for one of the two magazines, the said bank of escapements being located between the two magazines and freely and independently mounted in and detachably connected to the said frame.

47. In a typographical machine, the combination of a magazine, a shift-frame therefor, and a bank of escapements, the said bank of escapements being located between the magazine and shift-frame and being freely and independently mounted in and detachably connected to the latter.

48. In a typographical machine, the combination of a magazine, a shift-frame to move the magazine into and out of operative position, and a bank of escapements for the magazine freely and independently mounted in and detachably connected to the shift-frame.

49. In a typographical machine, the combination of a plurality of magazines and means for shifting them, actuating devices therefor located in proximity to the keyboard, and angularly inclined connections between the said actuating devices and shifting means.

50. In a typographical machine, the combination of a plurality of magazines and means for shifting them, actuating devices therefor located in proximity to the keyboard, and connections between the said actuating devices and shifting means, the said connections comprising an angularly located shaft.

51. In a typographical machine, the combination of a plurality of magazines, means for shifting the magazines and for bringing any selected one thereof into operative position, and registering and locking means therefor, together with a conjoint actuating device which when rotated effects the shifting of the magazines and when moved longitudinally reverses the position of the registering means.

52. In a typographical machine, the combination of a plurality of magazines, means for shifting the magazines and for bringing any selected one thereof into operative position, and registering and locking means therefor, together with conjoint actuating devices comprising an operating handle, which when moved in a circular direction effects the shifting of the magazines and when moved in a longitudinal direction reverses the position of the registering means.

53. In a typographical machine, the combination of a plurality of shiftable magazines and registering and locking means therefor, together with actuating devices for the said registering means, comprising a rotatable and pivoted ring and means for swinging the ring about its pivot.

54. In a typographical machine, the combination of a plurality of magazines, means for shifting the magazines and for bringing any selected one thereof into operative position, and registering and locking means therefor, together with conjoint actuating devices comprising a rotatable member to actuate the shifting means and a member pivoted thereto to actuate the registering means.

55. In a typographical machine, the combination of a plurality of magazines, means for shifting the magazines and for bringing any selected one thereof into operative position, and registering and locking means therefor, together with conjoint actuating devices comprising a rotatable member to actuate the shifting means, a member pivoted thereto to actuate the registering means, and a common handle whereby both of the said members may be operated.

56. In a typographical machine, the combination of a plurality of magazines, means for shifting the magazines and for bringing any selected one thereof into operative position, and registering and locking means therefor, together with conjoint actuating means comprising the wheel L, the pivoted member L² and the common actuating handle L¹.

57. In a typographical machine, the combination of a plurality of magazines and means whereby the magazines are moved vertically into and out of operative position, the said magazines being removably connected to the said means so as to permit the removal therefrom of any selected one independently of the others.

58. In a typographical machine, the combination of a plurality of magazines and a shift frame therefor whereby the magazines are moved vertically into and out of operative position, the said magazines being removably mounted in the said frame so that any one may be removed therefrom without disturbing the others.

59. In a typographical machine, the combination of a shift frame carrying a plurality of magazines, a plate also carried by the frame and provided with a corresponding plurality of fore-and-aft elongated notches, and a locking bar mounted in the machine frame and movable longitudinally of the magazines to engage in one or another of the notches so as to hold the corresponding magazine in operative position.

60. In a typographical machine, the combination of a shift frame carrying a plurality of magazines, a plate also carried by the frame and provided with a corresponding plurality of fore-and-aft elongated notches, a locking bar movable longitudinally of the magazines and adapted to engage in one or another of said notches, a spring for holding said bar in its locking position, and manually operable devices for moving the bar to unlocking position against the action of the spring.

61. In a typographical machine, the combination of distributing mechanism, a plurality of magazines, means for rendering one or another of said magazines operative at will, and devices for preventing the operation of said means while any type or matrices of the magazine in operation remain undistributed.

62. In a typographical machine, the combination of a plurality of magazines, means for rendering one or another of said magazines operative at will, and devices distinct from the type or matrices for preventing the operation of said means when a type or matrix is protruding from a magazine.

63. In a typographical machine, the combination of a movable magazine, and a feeler supported independently of the magazine and movable transversely across its mouth to detect the presence of protruding matrices.

64. In a typographical machine, the combination of a movable magazine, a channel-plate or guideway to receive the type or matrices therefrom, and means supported independently of the magazine and movable at will transversely between it and the channel-plate to detect the presence of matrices therebetween.

65. In a typographical machine, the combination of distributing mechanism, a shiftable magazine, a feeler to determine the presence or absence of matrices in the distributing mechanism, a second feeler to determine whether or not a matrix is protruding from the magazine, and means controlled by both said feelers for preventing the shifting of the magazine.

66. In a typographical machine, the combination of distributing mechanism, a shiftable magazine, a movable locking device to hold the magazine in operative position, and a matrix feeler connected to said locking device to prevent its movement when matrices are present in the distributing mechanism.

67. In a typographical machine, the combination of a shiftable magazine, a movable locking device to hold it in operative position, and a matrix feeler connected to said locking device to prevent its movement when matrices are protruding from the magazine.

68. In a typographical machine, the combination of a plurality of magazines arranged in close proximity one above another, an upper magazine being movable vertically away from an underlying magazine to permit the removal of the latter, and means for holding the upper magazine in its raised position during the removal of the underlying magazine.

69. In a typographical machine, the combination of a movable shift frame, a plurality of magazines mounted therein so as to be movable, one away from another, to permit their independent removal therefrom, and means for maintaining the magazines in their separated condition during their removal.

70. In a typographical machine, the combination of a movable shift frame, a plurality of magazines mounted therein and removable independently therefrom, and means for moving the magazines away from each other in the frame to permit their independent removal.

71. In a typographical machine, the combination of a plurality of magazines, a shift frame wherein they are mounted, and cam pieces for separating the magazines to permit their removal from the frame and provided with extended arms to support them during removal.

72. In a typographical machine, the combination of a plurality of magazines, and a shift frame wherein they are mounted, and detachable cam pieces adapted to be applied to any selected magazine to separate it vertically from the others for removal.

73. In a typographical machine, the combination of a plurality of magazines and a shift frame wherein they are mounted, and detachable cam pieces adapted to be applied to any selected magazine to separate it vertically from the others for removal, and provided with extended arms to support the magazines during removal.

74. In a typographical machine, the combination of a shiftable magazine, means for shifting it, a feeler supported independently of the magazine and movable transversely across its mouth to detect the presence of protruding matrices, and an actuating device common to both said shifting means and matrix feeler.

In testimony whereof I hereunto set my hand this 27th day of April, 1911, in the presence of two attesting witnesses.

JOHN R. ROGERS.

Witnesses:
E. J. LAMB,
WALTER MOBLARD.

Copies of this patent may be obtained for five cents each, by addressing the "Commissioner of Patents, Washington, D. C."